Nov. 8, 1955 A. J. BARACKET ET AL 2,723,307

MONTAGE AMPLIFIER

Filed Nov. 30, 1953 9 Sheets-Sheet 1

INVENTORS
ALBERT J. BARACKET
THOMAS M. MAXWELL, JR.
FRED H. NUMRICH

BY Percy P. Lantzy

ATTORNEY

Nov. 8, 1955 A. J. BARACKET ET AL 2,723,307

MONTAGE AMPLIFIER

Filed Nov. 30, 1953 9 Sheets-Sheet 2

INVENTORS
ALBERT J. BARACKET
THOMAS M. MAXWELL, JR.
FRED H. NUMRICH
BY Percy P. Lantzy
ATTORNEY

MONTAGE AMPLIFIER

Filed Nov. 30, 1953

INVENTORS
ALBERT J. BARACKET
THOMAS M. MAXWELL, JR.
FRED H. NUMRICH
BY Percy P. Lantzy
ATTORNEY Nov. 8, 1955 A. J. BARACKET ET AL 2,723,307

MONTAGE AMPLIFIER

Filed Nov. 30, 1953 9 Sheets-Sheet 4

INVENTORS
ALBERT J. BARACKET
THOMAS M. MAXWELL, JR.
FRED H. NUMRICH

BY [signature]

ATTORNEY

INVENTORS
ALBERT J. BARACKET
THOMAS M. MAXWELL, JR.
FRED H. NUMRICH
BY Percy P. Lantzy
ATTORNEY INVENTORS
ALBERT J. BARACKET
THOMAS M. MAXWELL, JR.
FRED H. NUMRICH
BY Percy P. Lantzy
ATTORNEY INVENTORS
ALBERT J. BARACKET
THOMAS M. MAXWELL, JR.
FRED H. NUMRICH
BY Percy P. Lantzy
ATTORNEY INVENTORS
ALBERT J. BARACKET
THOMAS M. MAXWELL, JR.
FRED H. NUMRICH
BY Percy P. Lantzy
ATTORNEY INVENTORS
ALBERT J. BARACKET
THOMAS M. MAXWELL, JR.
FRED H. NUMRICH
BY Percy P. Lantzy
ATTORNEY 2,723,307

MONTAGE AMPLIFIER

Albert J. Baracket, Bloomfield, Thomas M. Maxwell, Jr., Fairlawn, and Fred H. Numrich, Clifton, N. J., assignors to International Telephone and Telegraph Corporation, Nutley, N. J., a corporation of Maryland Application November 30, 1953, Serial No. 394,966

18 Claims. (Cl. 178—6)

This invention relates to electronic amplifier systems and more particularly to improved montage amplifier circuitry and control means therefore.

There are many situations where it would be advantageous to show two scenes as though from separate picture pickup units at one time on a television screen, or to show separate parts or separate views of the same scene at the same time to focus the attention of the audience on these separate segments. Another advantage of such a system would be to show more distinctly two or more separate actions that blend to make a complete picture of the players at widely separated areas in a game such as in baseball and football, or enable the audience to observe two or more distinct segments or views of the same action, or to include an advertising announcement as a part of the television framing information without disrupting the action being televised. In some television transmission systems, such operations have been accomplished by superimposing two video frame signals which resulted in an overall reduction of contrast and brightness, or both.

In the copending application of A. J. Baracket, Serial No. 279,230, filed March 28, 1953, entitled Montage Amplifiers, an amplifying system is disclosed for simultaneously transmitting two or more separate television video frame signals for presentation on a receiving television screen in the same frame, but so transmitted that each of the separate video frame signals are presented thereon simultaneously with substantially the same contrast and brightness as when they are presented separately. The circuitry disclosed in the copending application enabled the switching of a plurality of video signals to occupy predetermined positions in a television frame signal by utilization of a key signal derived from one of the projection units incorporated as a component of the master control arrangement thereby enabling a montage effect. Other special effects such as fade and lap dissolve were accomplished by directly switching selected video signals to the two channels of the signal routing system. It has been found that by rearranging the control panel associated with the montage amplifier and by providing means to control the video switching other than direct application of the video signal to the signal routing means that the circuitry of the montage amplifier is reduced in the necessary relays required and provides a more efficient operation thereof. Therefore, it is an object of this invention to provide an improved montage amplifier capable of simultaneously transmitting two or more separate television video frame signals for presentation on a receiving television screen in the same frame whereby the switching of the video signals to the signal routing means is controlled by varying the D. C. bias potential applied to normally non-conductive signal selectors coupled individually to separate video signal sources rather than by the heretofore employed direct switching of video signals to the signal routing means.

Another object of this invention is to provide control means for lap dissolving and fading of two separate and distinct video signals at preset rates by controlling the reference bias of the electron discharge devices included as in the signal channels of the signal routing means.

Still another object of this invention is the provision of means enabling the coupling of video signals derived from projection units to corresponding signal selector circuits having two conductive paths therein regardless of whether the transparency therein employed is positive or negative.

A feature of this invention is the provision of a plurality video signal sources having associated with each source a signal selector having two normally non-conductive paths, a source of bias voltage and means to vary the bias for switching a selected signal to the input of a desired signal channel in the signal routing means and a bias control means associated with the signal channels of said signal routing means for selection of the signal channel through which the switched signal will pass.

Another feature of this invention relates to the coupling means between the video signal source and the signal selector whereby the polarity of the video signals from the video sources may be selected in accordance with the type of film therein incorporated, the input to said coupling means including a gamma correction circuit for each of the transparency derived signals emitted from the signal source.

Still another feature of this invention is the control of lap dissolve or signal fade at preset rates by varying the clamping reference voltage of the electron discharge device included as components of the channels of the signal routing means. The preset rates of this automatic switching being accomplished by R. C. networks which provide an exponential voltage rise to one clamping reference and an exponential voltage decay to the other clamping reference with the initial magnitude of the voltage acted upon by the R. C. network determining whether the automatic switching accomplishes a lap dissolve or a fade between signals on the two channels of the signal routing means.

Other features of this invention include a keying signal clipping means functioning during montage operation to minimize the effect of irregularities in the negative regions of the keying signal derived from one of the signal sources to alternately key the two normally non-conductive channels of the signal routing means. Circuit means is provided to enable the previewing of a signal prior to switching the previewed signal to an "on-the-air" condition. The preview output is presented through that path of the signal selector which is not being utilized by the signal routing means. This preview feature is deactivated by appropriate bias control circuits when a manual switching operation is in effect or when two signals are being montaged.

The above-mentioned and other features and objects of this invention will become more apparent by reference to the following description taken in conjunction with the accompanying drawings, in which.

Figure 1A:
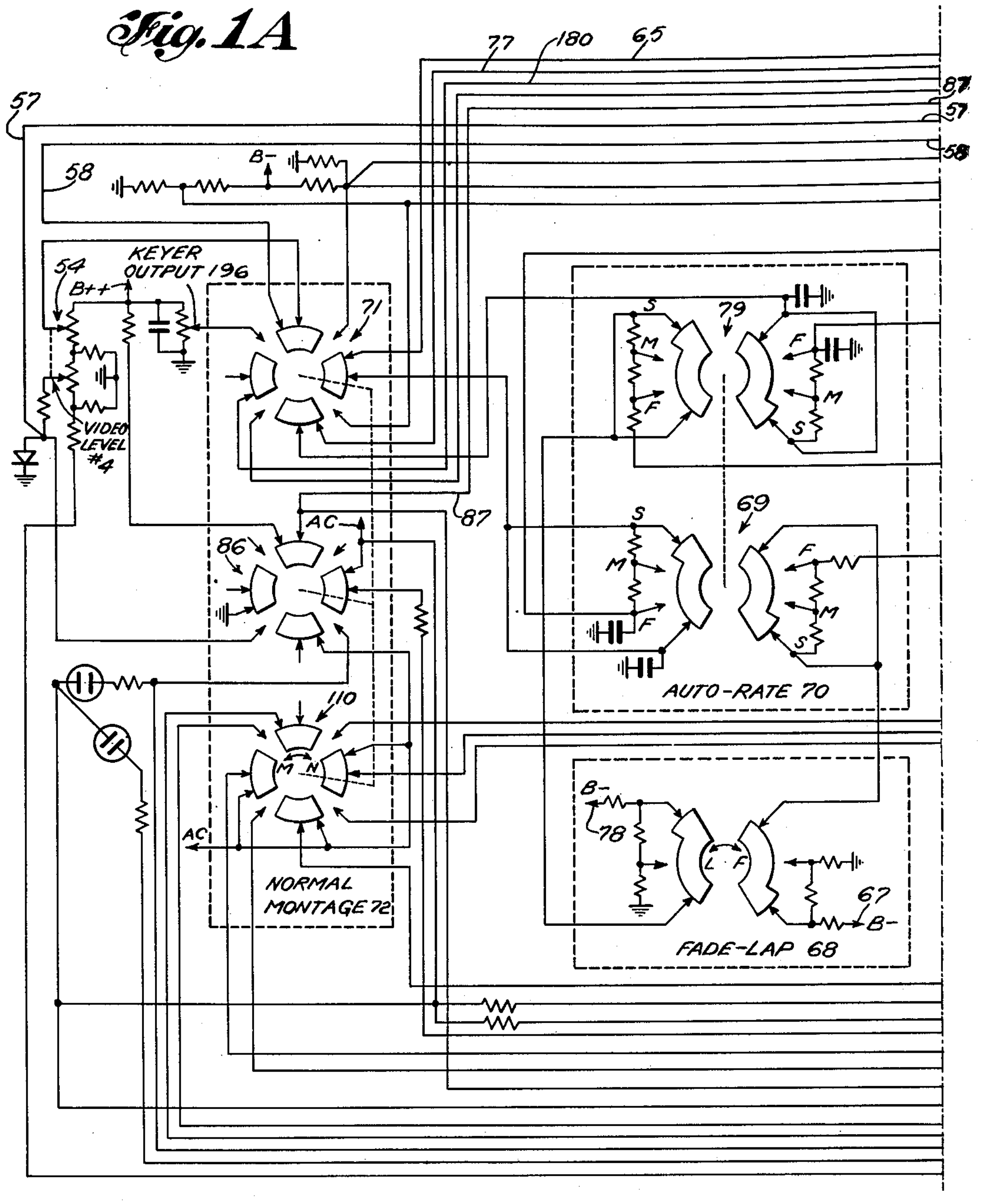
Figs. 1A–1D illustrate in schematic and block form the overall electronic amplifier system in accordance with this invention when the Figs. 1A–1D are arranged as illustrated by Fig. 2.
Figure 2:
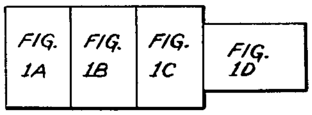

Referring to Figs. 1A–1D arranged as illustrated in Fig. 2, there is illustrated a dual flying spot scanner incorporating therein the electronic amplifying system in accordance with this invention. The flying spot scanner for purposes of describing the functioning of our electronic amplifying system is shown to comprise five basic components; namely, projection units 1 and 2, the montage amplifier 3, the video generator 4, the deflection and blanking amplifier 5 and a plurality of control units accessible on the panel of the flying spot scanner for controlling the operation of the montage amplifier 3.

A flying spot of light generated on the face of cathode ray tube 6 through the action of the deflection system 5 is caused to scan transparencies 7 and 8 in each of the projection units 1 and 2 by appropriate disposition of mirrors 9, 10 and 11 and lenses 12 and 13 as illustrated. A condensing lens as indicated at 14 and 15 in each projection unit directs light from the transparencies 7 and 8 into their associated photo-multiplier tubes 16 and 17 respectively. The action of the photo-multiplier tubes 16 and 17 is to convert the varying degrees of light and shades on the respective transparencies into a modulated video signal.

The amplified output of each projection unit is conducted to the montage amplifier 3 which combines the functions of further amplification having therein the option of the gamma correction, special effects including a lap dissolve and fade between two or more signals and a montage effect of two or more signals. There is further included in montage amplifier 3 a provision for preview selection enabling an operator to monitor a given video signal other than that which is on the air. The line output of amplifier 3 is coupled to video generator 4 by means of an appropriate video transmission line as indicated by line 18. Video generator 4 provides further amplification of the video signal output from amplifier 3 and adds thereto the necessary blanking and synchronizing signals for production of a composite picture signal output which may be applied directly to a broadcast transmitter indicated in Fig. 1D as composite picture utilization means 19, and/or to the composite picture monitor **19*a* as the case may be The primary function of projection units 1 and 2 is to convert the light energy of the flying spot generated in scanner 6 which scans the transparencies 7 and 8 into a modulated video signal. This process occurs in the photomultiplier tubes 16 and 17**. The flying spot of light impinging upon the light sensitive cathode causes an electron flow to the first multiplier dynode proportional to the intensity of the light received. As is the practice, this dynode is maintained less negative than the cathode and in our case, is approximately 125 volts less negative than the cathode. This difference of potential between the first dynode and the cathode results in secondary emission since the electrons from the cathode striking the dynode dislodges a large number of electrons which are in turn attracted to the even less negative second multiplier dynode. This multiplying process continues throughout the remaining multiplier dynodes, each of which is more positive than the last.

For a given light intensity, the current flow in the multiplier tubes 16 and 17 is dependent upon the potential difference between the elements. A potentiometer (not illustrated) utilized as the sensitivity adjustment varies the difference in potential between the cathode and the final multiplier dynode and the potential difference between each of the other dynodes are caused to vary proportionately. A second potentiometer ganged to the sensitivity adjustment assures a constant potential difference between the cathode and the first multiplier dynode irrespective of the setting of the sensitivity adjustment.

The output of he final multiplier dynode of multiplier tubes 16 and 17 encounters two video amplifiers which constitute the scanner preamplifier having in the grid circuit of the last one of said amplifiers inductors to compensate for stray capacitance in the grid circuit and employs series peaking inductors to satisfy bandwidth requirements. The signal from the preamplifier goes to an output stage incorporating therein two output terminals as indicated at 20 and 21 on projection unit 1. Terminal 20 is connected to the anode of the electron discharge device incorporated in the output stage of projection unit 1 and is employed when a positive type transparency is being scanned therein. Terminal 21 is connected to the cathode of the electron discharge device incorporated in the output stage of projection unit 1 and is employed during those occasions when the transparency being scanned is of the negative type. Terminals 22 and 23 of projection unit 2 have the same function and relationship with the output stage therein as does terminals 20 and 21 associated with projection unit 1. Positive-negative transparency switches 24 and 25 located on the side of their respective projection units cooperate in selecting the appropriate bias to facilitate the acceptance of the appropriate output signals from the selected projection units with the switching to either the positive or negative input which occurs in montage amplifier 3.

Figure 1B:
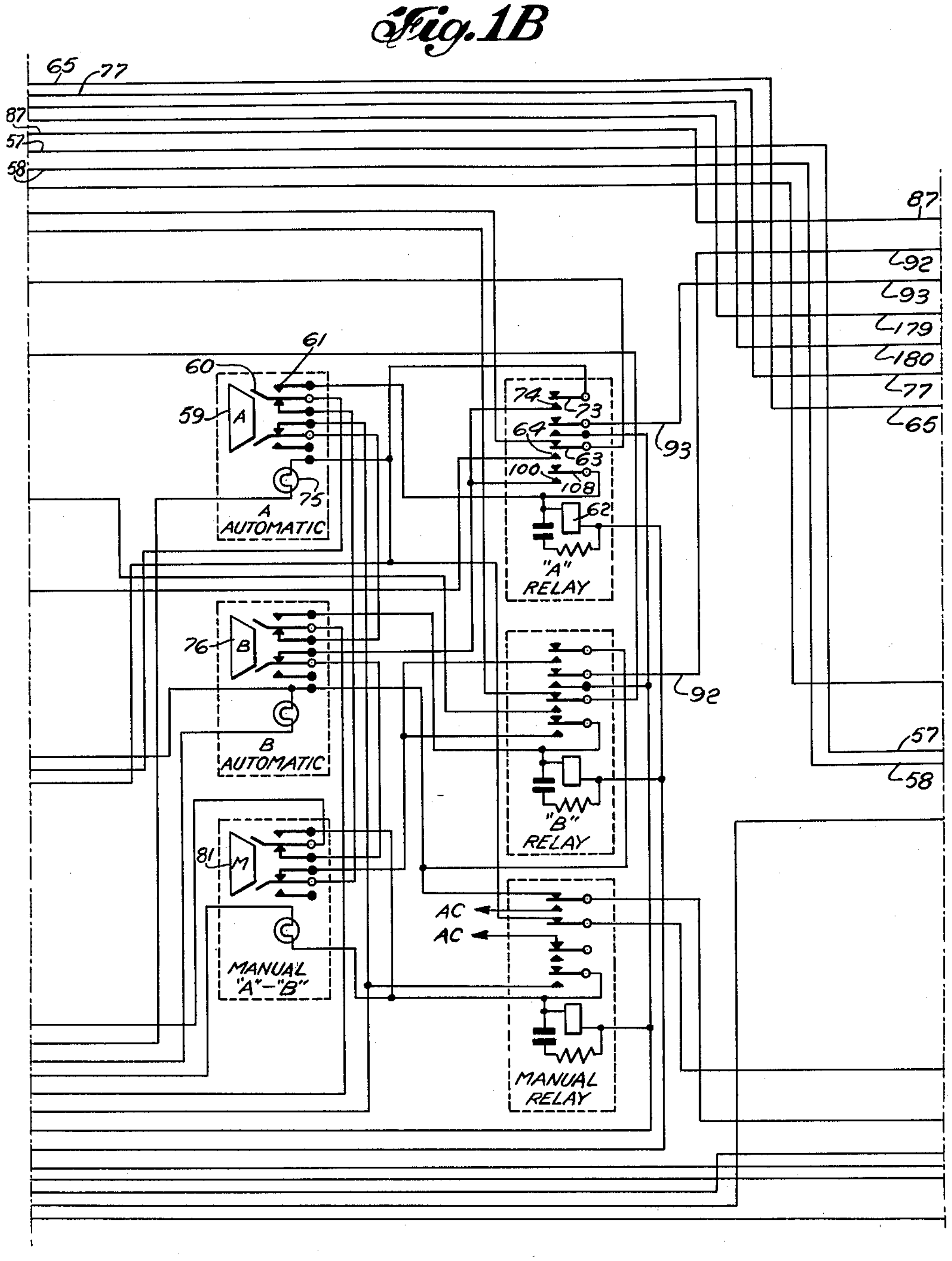
Figure 1C:
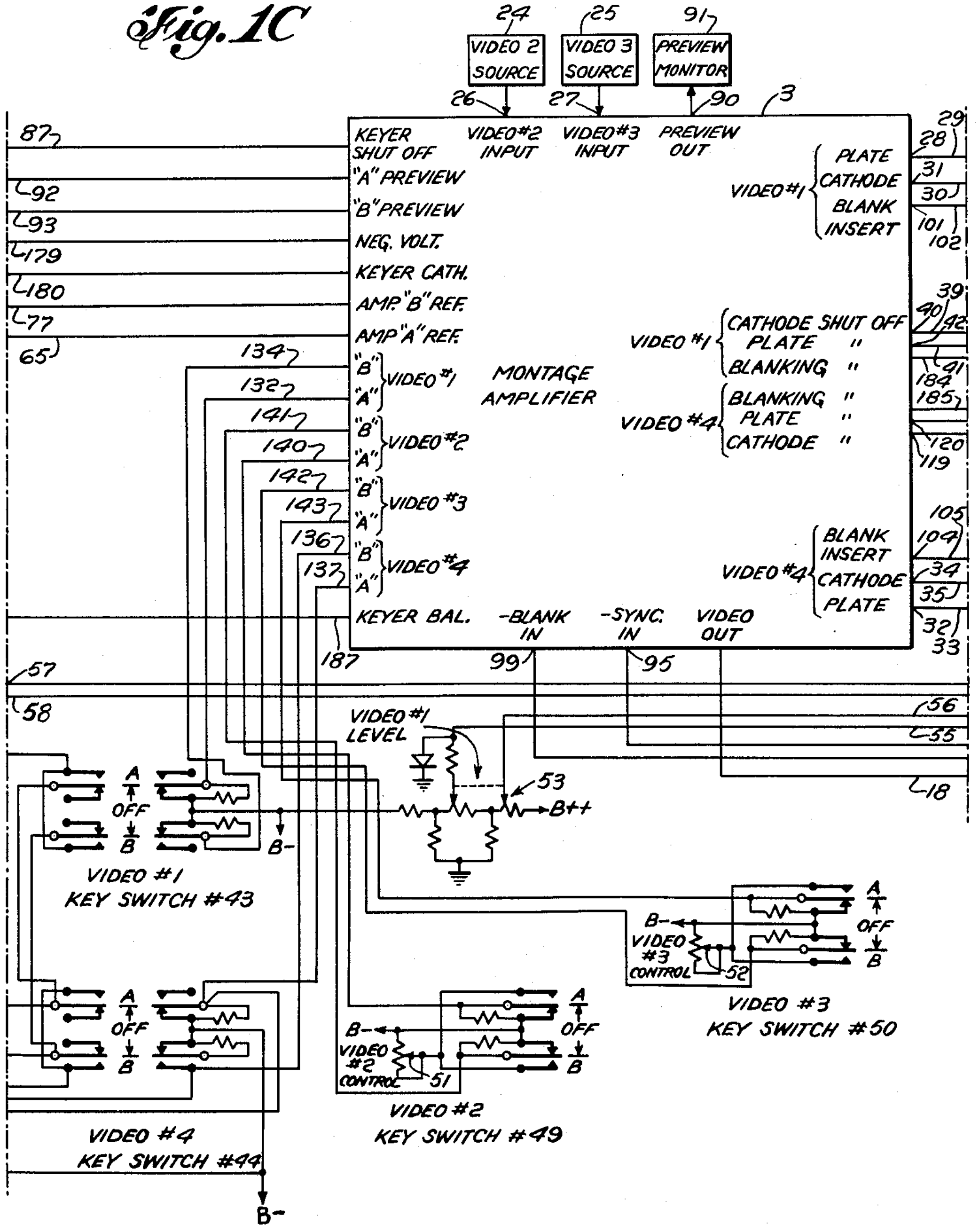
Figure 1D:
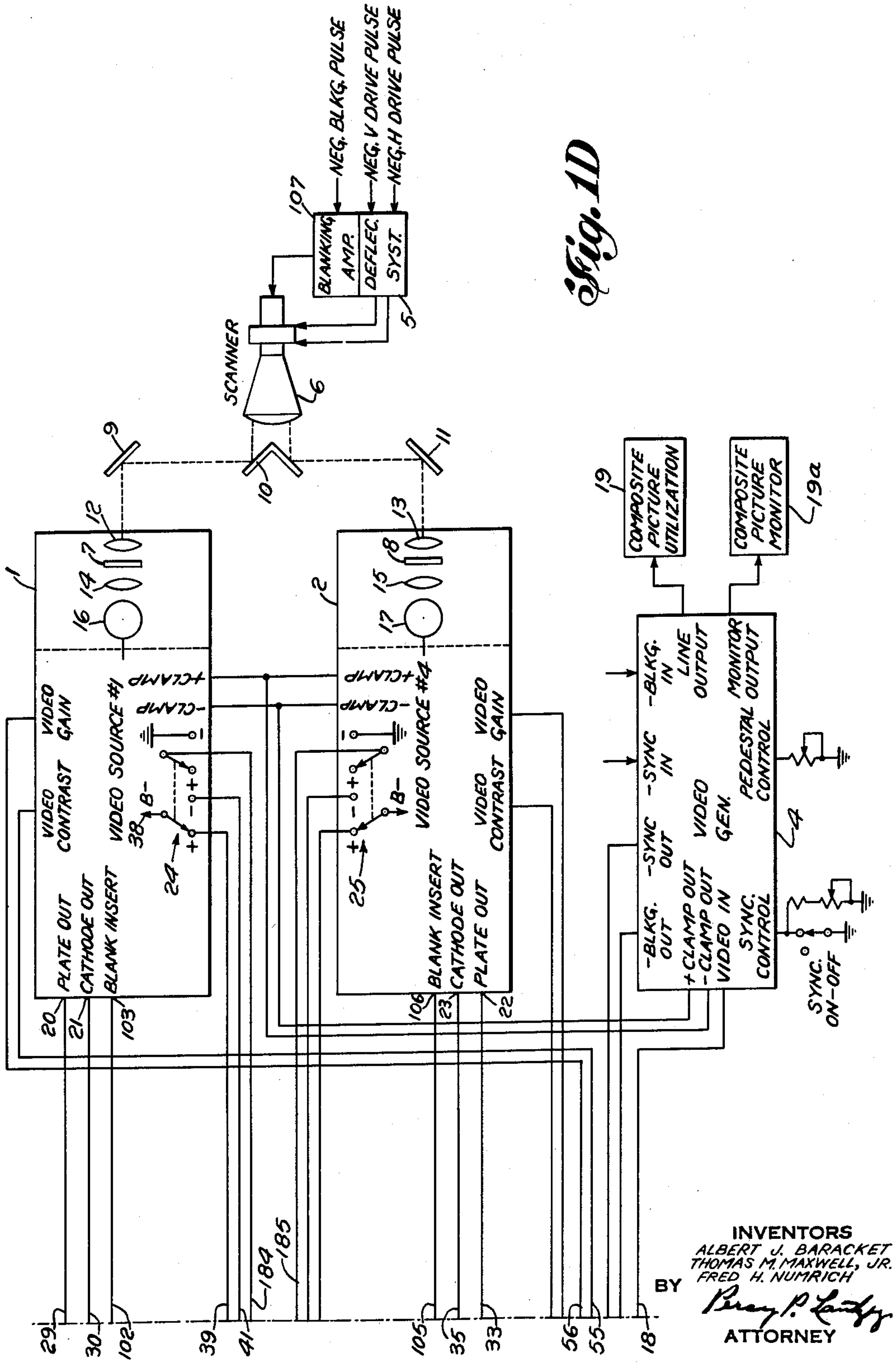
Figure 3:
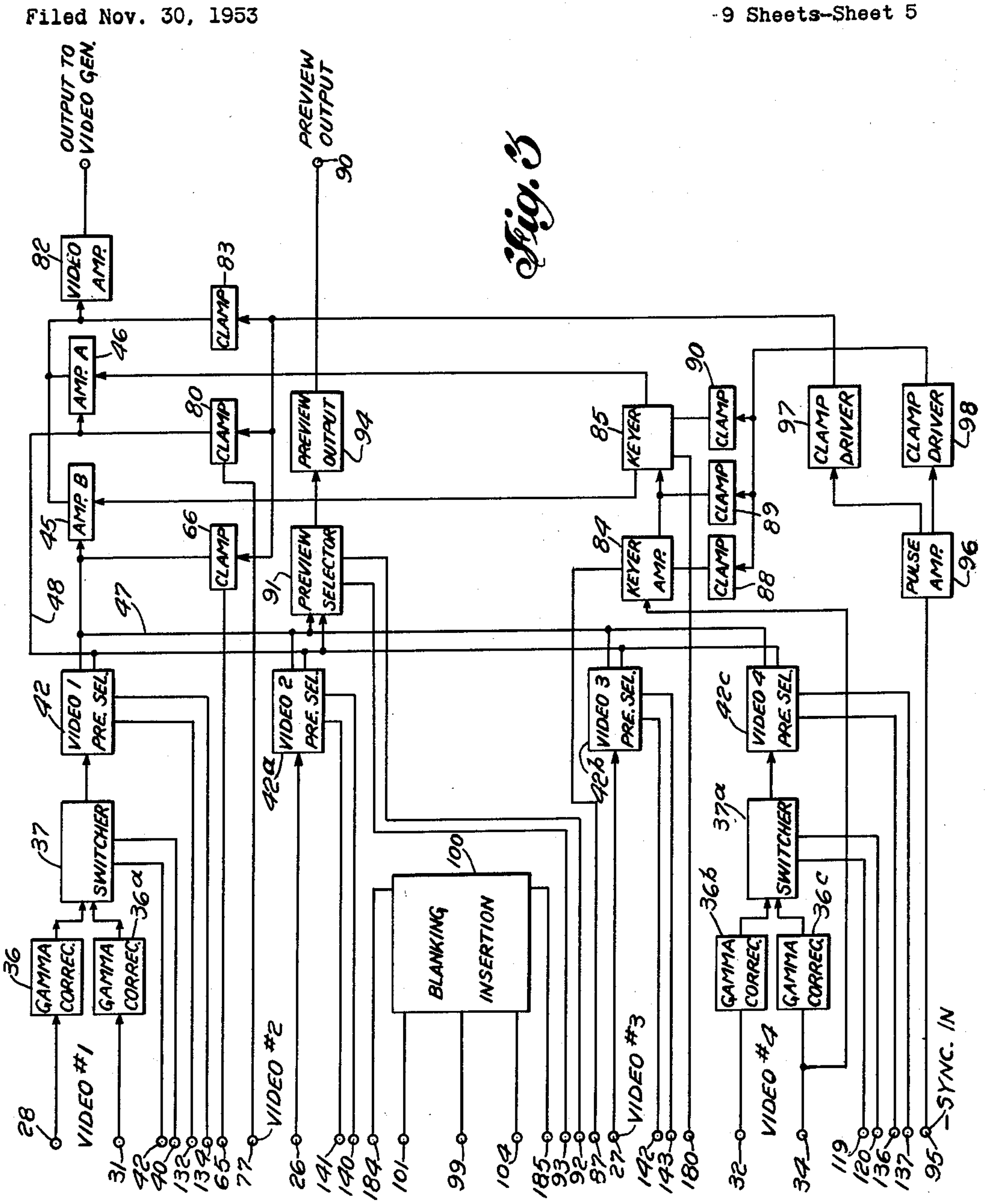
Fig. 3 is a block diagram of the montage amplifier of Fig. 1C.

The montage amplifier 3 illustrated as a large block in Fig. 1C and in a more detailed block diagram in Fig. 3 has four facilities capable of receiving video signals from four different sources and two internal video signal channels identified as channel A and channel B which function as the signal routing means of this invention. Video signal #1 and video signal #4 inputs accommodate the signals generated in projection units 1 and 2 respectively. Video signal #2 and #3 inputs can be used for receiving at the terminals thereof the signal from a film chain or a television camera, these sources being indicated by blocks 24 and 25 respectively, connected to terminals 26 and 27 of the montage amplifier 3. Any one of the four inputs, or a combination of two or more may be switched by appropriate control of the bias voltage associated with their respective preselector amplifiers onto either of the internal channels.

The output of the projection unit 1 enters montage amplifier 3 at terminal 28 when the signal from unit 1 is conducted from the plate output 20 along conductor 29. If the cathode output of unit #1 is employed, then the signal from terminal 21 of unit 1 is conducted along conductor 30 to terminal 31 of montage amplifier 3. The output of projection unit 2 enters amplifier 3 at terminals 32 along conductor 33 when the plate output from unit 2 is employed and enters terminal 34 along conductor 35 when the cathode of unit 2 is employed. As has already been stated, the plate input of projection units are employed when the scanner 6 is scanning a positive transparency and the cathode input is employed when scanner 6 is scanning a negative transparency.

Gamma correction may be applied to either plate or cathode input signals coming from both projection units through means of the gamma correction circuitry illustrated in Fig. 3 by the blocks 36, each of these blocks including therein identical circuitry as described in detail in the copending application of A. J. Baracket, Serial No. 301,070, filed July 26, 1952, entitled "Gamma Corrector and Frequency Compensating Circuit." As disclosed in this copending application and employed in the electronic amplifying system of this invention, the gamma correction circuit precompensates for non-linear relationship between highlight brightness and grid signal voltages in the picture tubes of studio monitors and home reecivers. When employing gamma correction, the video signal is fed across a crystal diode impedance. The non-linear relationship between current and applied voltage in the crystal diode employed therein, precompensates for non-linear transfer characteristics of a cathode ray tube by effectively expanding the "black" portions of the video signal.

Both the plate and cathode inputs of each projection unit are fed to identical switcher stages 37. One half of switcher stage 37 is connected to the plate input and the other half is connected to the cathode input. When the projection unit positive-negative switch, such as switch 24 of projection unit 1, is on positive, a bias voltage as applied at terminal 38 is coupled along conductor 39 to terminal 40 of the montage amplifier 3 such that the bias voltage is applied to the cathode input, or negative, half of switcher 37, and only the plate input half will conduct. With the positive-negative switch 24 switched to the negative position, the bias voltage at terminal 38 is conducted along conductor 41 to terminal 42 and hence, to the plate input, or positive, half of the switcher such that the plate input half of the switcher 37 is biased beyond cut-off and only the cathode input half will conduct. The operation of positive-negative switch 25 in projection unit 2 with reference to switcher 37*a* of the video #4 signal input, functions identically as described above with reference to the video #1 signal input facilities. The selected output of each switcher stage goes to an associated video preselector stage as indicated by block 42 with reference to video #1 switcher 37. This stage sends the selected video signal into either one of the two internal channels, channel A or channel B as selected by the appropriate control switches. The function of the selectors 42 is controlled by the key switches 43 and 44 on the control panel, each of these switches being associated with their respective video signal preselector amplifier for channeling the selected video signal to one of the signal channels of the signal routing means, channels A or B, as is desired.

Video signal #2 and video signal #3 from their respective signal source enter the montage amplifier on terminals 26 and 27 respectively. These two input channels may be used interchangeably for a film chain, a camera, or any other video source having the proper amplitude, such as one volt, and polarity, black negative. Both of these video inputs have incorporated therewith preselector stages identified respectively as preselector 42*a* and 42*b* similar in operation to preselector 42 and 42*c* associated with video #1 and video #4 respectively.

The outputs of the preselector stages 42 and 42*c* are coupled as indicated to each of the channel amplifiers 45 and 46, forming the basic components of our signal routing means, along conductors 47 and 48 depending upon the position of their respective key switches 43 and 44. As is the case with respect to video #1 and video #4, video #2 and video #3 have associated therewith key switches 49 and 50, respectively, to control the routing of their preselector signal output into either one of the amplifiers 45 or 46, likewise along conductors 47 and 48, respectively. The output amplitude of video #2 and video #3 preselectors 42*a* and 42*b* is adjusted by the video #2 and video #3 controls 51 and 52, respectively, an internal adjustment, which function to vary the bias on their associated preselector tubes. Amplitude controls for video #1 and video #4 as indicated at 53 of Fig. 1C and 54 of Fig. 1A function to vary the overall video gain of projection units 1 and 2 respectively. The adjusted voltage for video #1 is conducted from control 53 along conductors 55 and 56 to control the video contrast and video gain of projection unit 1 while the adjusted voltage for video #4 is conducted from control 54 along conductors 57 and 58 to control the video contrast and video gain of projection unit 2.

The selection of signals from channels A or B, or both, as constituted by amplifiers 45 and 46, for the video output is accomplished by means of the automatic A, automatic B, or manual A—B pushbuttons situated on the control panel and illustrated in Fig. 1B. Operation of pushbutton 59 causes switch blade 60, carrying an a. c. voltage thereon, to make contact with contact 61 to energize the solenoid 62 of relay A. Upon energizing solenoid 62, armature 63 is caused to make contact with contact 64 which places a voltage upon conductor 65 sufficient to raise the reference voltage on clamp 66 causing the bias on amplifier 45 to be reduced and permitting amplifier 45 to conduct. The voltage applied along conductor 65 to clamp 66 is obtained from terminal 67 and the voltage divider associated therewith and in the fade-lap switch 68. The voltage from terminal 67 is operated on by an RC network associated with section 69 of the auto-rate switch 70. The action of the RC network is to provide an exponential voltage for conduction through section 71 of the normal-montage switch 72. Through means of armature 73 and contact 74 of the A relay, an a. c. voltage is placed across lamp 75 of the automatic A pushbutton switch to cause illumination of pushbutton 59 thereby indicating that the signal selected by the key switches are passing through channel A of the montage amplifier.

Operation of pushbutton 76 of the automatic B pushbutton switch functions in substantially the same manner as described above in connection with the automatic A pushbutton switch to place a voltage upon conductor 77 from terminal 78 associated with the fade-lap switch 68 and section 79 of the auto-rate switch 70 and section 71 of the normal-montage switch 72 to change the reference voltage upon clamp 80 thereby reducing the bias on amplifier 46 for conduction thereof.

Operation of pushbutton 81 in the manual A—B pushbutton switch which causes activation of the manual relay allows both amplifiers 45 and 46 to conduct, the output signal depending entirely upon the video level controls 51, 52, 53 and 54 and the position of key switches 43, 44, 49 and 50. It will be noted that the automatic A and automatic B relays operate only when the normal-montage switch 72 is in the normal position, the position illustrated in the drawings.

In the montage amplifier, automatic switching between channels A and B of the signal routing means, as accomplished by regulating the clamping level of the various clamp circuits associated therewith, can be controlled by two different methods with the normal-montage switch 72 on the normal position. With the fade-lap dissolve switch 68 on the fade position, one channel signal is caused to fade out before the other channel signal fades in. With the switch 68 on the lap dissolve position, one channel signal is brought to full signal level simultaneously with the fading out of the other channel signal. It can be stated that the magnitude of the voltage conducted from terminals 67 and 78 as controlled by the position of the switch segments in switch 68 with respect to the taps of the voltage divider associated with the respective voltage terminals determine whether the special effect will be of the fade type or the lap dissolve type. The auto-rate switch 70 having slow, medium and fast positions thereon regulates the rate of either a fade or a lap dissolve to three different speeds dependent upon the RC network connected to the clamps 66 and 80 to control the conduction of the selected channel amplifiers 45 and 46.

The signal output of both channel amplifiers 45 and 46 is further amplified by the video amplifier 82 prior to being conducted along conductor 18 to the video generator 4. The signal input to amplifier 82 is clamped at a predetermined input level by the clamping stage 83. When the manual pushbutton 81 is pressed, both channels A and B signals are applied to the video output. This provision permits mixing of two selector signals as selected by the key switches associated with corresponding video signal source. The video level controls associated with the corresponding key switches and video source provide sufficient amplitude for the selected signals to cause conduction in amplifiers 45 and 46 over the reference voltage as established by clamping devices 66 and 80. Besides providing the mixing of two signals it is possible to manually control the fading or lap dissolving of the two selected video signals by means of the appropriate panel mounted video level controls.

With the normal-montage switch 72 switched to the montage position, a masking slide in one of the two projection units, such as projection unit 2, is used to generate a keying signal which selects the periods of conduction between channel A and channel B. These periods of conduction, in turn, select the positions of the output signal devoted to channel A or channel B. With a masking slide, projection unit two has a video output signal which is alternately black or white, depending upon whether the flying spot of scanner 6 is scanning an opaque or transparent portion of the slide. This keying signal from projection unit 2 is conducted along conductor 35 to the cathode input terminal 34 and hence, directly to the keyer amplifier 84 and then to the keyer stage 85. The keyer 85 incorporates two outputs, one of said outputs having a polarity opposite the polarity of the other of said outputs. These two outputs are coupled to the signal routing means with one output being coupled to amplifier 45 and the other of the outputs being coupled to amplifier 46. By means, the keyer is able to cause conduction alternately in either channel A or channel B, one channel being caused to conduct during the black position of the masking slide and the other channel during the white position. With different designs of masking slides almost any desired montage effect can be obtained. A detailed description of the generation of the keying signal as hereinabove outlined may be obtained by reference to the copending application, Serial No. 279,230. During the montage operation, both the video level control 84 and the key switch 44 associated with video signal # 4 are disabled to prevent the keying signal from appearing in the video output signal by means of section 86 of the normal-montage switch 72 which substantially grounds out the effective control voltage normally associated with the switching, selection and signal routing of video signal #4. Another function performed by section 86 of the normal-montage switch 72, when in the montage position is, to remove an extremely positive bias voltage from keyer amplifier 84 normally conducted along conductor 87 to enable the activation of amplifier 84 by the keyer signal. Upon returning switch 72 to the normal position, the positive voltage will again be conducted along conductor 87 to amplifier 84 and provide a shutoff for this keyer amplifier.

Keyer amplifier 84 has its signal appropriately clamped at a predetermined level by the action of the clamp stage 88. The two outputs of the keyer 85 also have ther signals appropriately clamped by the action of clamps 89 and 90.

With the normal-montage switch 72 on the normal position, and either automatic A or automatic B relays energized, a selected video signal is applied to the video output while another selected signal is automatically switched to the preview circuit and ultimately to the preview output terminal 90 for utilization in the preview monitor 91 which enables the preview of a selected video signal prior to switching this signal to the video output. The lines 47 and 48 connected to the channels A and B amplifier are, likewise, associated with a preview selector 91. Preview selector 91 includes two portions, one portion associated with amplifier 45 of channel B and the other portion associated with amplifier 46 of channel A. One portion of selector 91, that portion corresponding to the channel signal applied to the video output, is maintained cutoff through the action of the relay A or B by conducting along conductors 92 and 93 a positive voltage to that portion of the preview selector 91 associated with the signal channel other than the one selected by the operation of the channel relays. The signal from the other channel is amplified by preview output stage 94 which delivers the signal to be previewed to the preview output terminal 90.

A negative synchronizing signal from a synchronizing generator (not illustrated) enters amplifier 3 at terminal 95 and is amplified by pulse amplifier 96 as illustrated in Fig. 3. The output of amplifier 96 activates clamp drivers 97 and 98. Clamp driver 97 provides the appropriate driving energy for the activation of back porch clamps 66, 80 and 83 associated with the signal routing means and their common output means identified as channel amplifiers 45 and 46 and the common video amplifier 82. Clamp driver 98 in turn drives the keyer clamps 88, 89 and 90 to achieve the desired operation thereof.

The montage amplifier 3 further provides what has been termed "blanking insertion" for the projection units 1 and 2 when operated with a negative transparency and positive-negative switches 24 and 25 in the negative position. The blanking insertion is accomplished by providing at terminal 99 of amplifier 3 a negative blanking signal input which is coupled to the blanking insertion circuitry 100 for production and control of the blanking insertion output associated with projection units 1 and 2. The resulting blanking insertion is coupled from terminal 101 of amplifier 3 by conductor 102 to the blanking insertion input terminal 103 found in projection unit 1. The required blanking insertion signal for video signal #4 leaves montage amplifier 3 at terminal 104 along conductor 105 for insertion in the signal output of unit 2 by entering therein through terminals 1 and 6. The details of blanking insertion circuitry 100 have been disclosed in the copending application of A. J. Baracket and S. A. DeMars, Serial No. 368,302 filed July 16, 1953, and entitled "Light Energy to Video Signal Transducing." As disclosed therein and utilized in the montage amplifier of this invention, when a negative transparency is being scanned by scanner 6, say in projection unit 1, the positive-negative switch 24 is switched to negative, and the output from unit 1 is taken from terminal 21 along conductor 30 to terminal 31 of the montage amplifier 3 rather than from the plate output at terminal 20 of unit 1. This means that the polarity of the light video signal is reversed, including the blanking interval, as established by the blanking amplifier 107 of Fig. 1D, which now occurs at the most negative level of the signal. In order to restore the correct polarity of the blanking interval, without interferring with the correct polarity of the video signal for a negative type transparency, a correcting blanking insertion pulse, equal in amplitude and opposite in polarity, is coupled to terminal 103 for addition to the signal output of the first amplifier included in the preamplifier of projection unit 2.

Having now described the electronic amplifying system of this invention to illustrate the interconnectoin between the various components therein and the function of each with respect to each other, it should be pointed out that certain of the controlling components have features that enhance the operation of our system and thereby provide an extremely efficient controlling means for the routing of selected video signals through the signal routing means of the montage amplifier 3 whereby special effects and montaging of selected signals may be efficiently achieved. One of these features includes a holding arrangement associated with the channel A, channel B and manual relays. The pushbuttons 59, 76 and 81 respectively associated with the relays are of the momentary contact type such that depressing a selected one of the pushbuttons will energize its associated relay. The armature and the contact along with the A. C. voltage applied to the contact closest to the solenoid forms a holding circuit which maintains an A. C. voltage across the solenoid until such time as another pushbutton is depressed. For example, the momentary depressing of pushbutton 59 causes solenoid 62 to become energized. When energized, solenoid 62 causes armature 108 to make contact with contact 109 which has applied thereto an A. C. voltage to maintain solenoid 62 energized until another of the pushbuttons is depressed. This eliminates the necessity of operator holding his finger upon the pushbutton during that time in which a selected signal is traversing the selected channel of our signal routing means.

An occasion may arise where it would be desirable to transmit a selected signal through a selected channel, then interrupt this transmission to insert a commercial or other information with this signal or another signal by a montage operation, and then return to the original transmitted signal. This may readily be accomplished by the controlling means of amplifier 3.

With normal-montage switch 72 positioned for normal operation, a video signal as selected by one of the key switches may be caused to traverse channel A by depressing pushbutton 59 and activating relay A. This operation provides channel B for preview of another signal by reason of the bias conducted along conductor 93 to the preview selector 91 of Fig. 3. The activation of relay A further enables the conduction of the selected video signal for on-the-air presentation through channel A of the signal routing means by application of the proper bias voltage along conductor 65. A further operation available is the switching from channel A to channel B by means of the bias potential associated with the fade-lap switch 68 whose rate of rise or decay is controlled by the RC networks associated with the auto-rate switch 70. The bias voltages being conducted along conductors 65 and 77 to montage amplifier 3 providing the desired switching of two signals between the selected channels.

The desired montage operation is accomplished by switching the normal-montage switch 72 to the montage position which functions to present to the keyer amplifier 84 a keying signal from projection unit 2, removes the bias from amplifier 84 and deactivates video key switch 44 and the video level control associated therewith. The normal-montage switch 72, by means of section 110 thereof, couples an A. C. voltage to armature 73 of relay A and its associated contact 74 for application of this A. C. voltage to contact 109, the contact associated with the holding circuit of solenoid 62. Section 71 of the normal-montage switch 72 places upon conductors 65 and 77 an equal negative voltage for conduction to the clamping stages 66 and 80 of sufficient value to enable the alternate keying of amplifiers 45 and 46 by the two outputs of keyer 85. When the montage action is completed and it is desired to return to the original condition as established by the pushbuttons, in this example, pushbutton 59, the normal-montage switch 72 is returned to the normal position and the conduction condition of the signal routing means will automatically be returned to the previous selected condition provided the key switches have been maintained or returned to the previous condition.

Figure 4A:
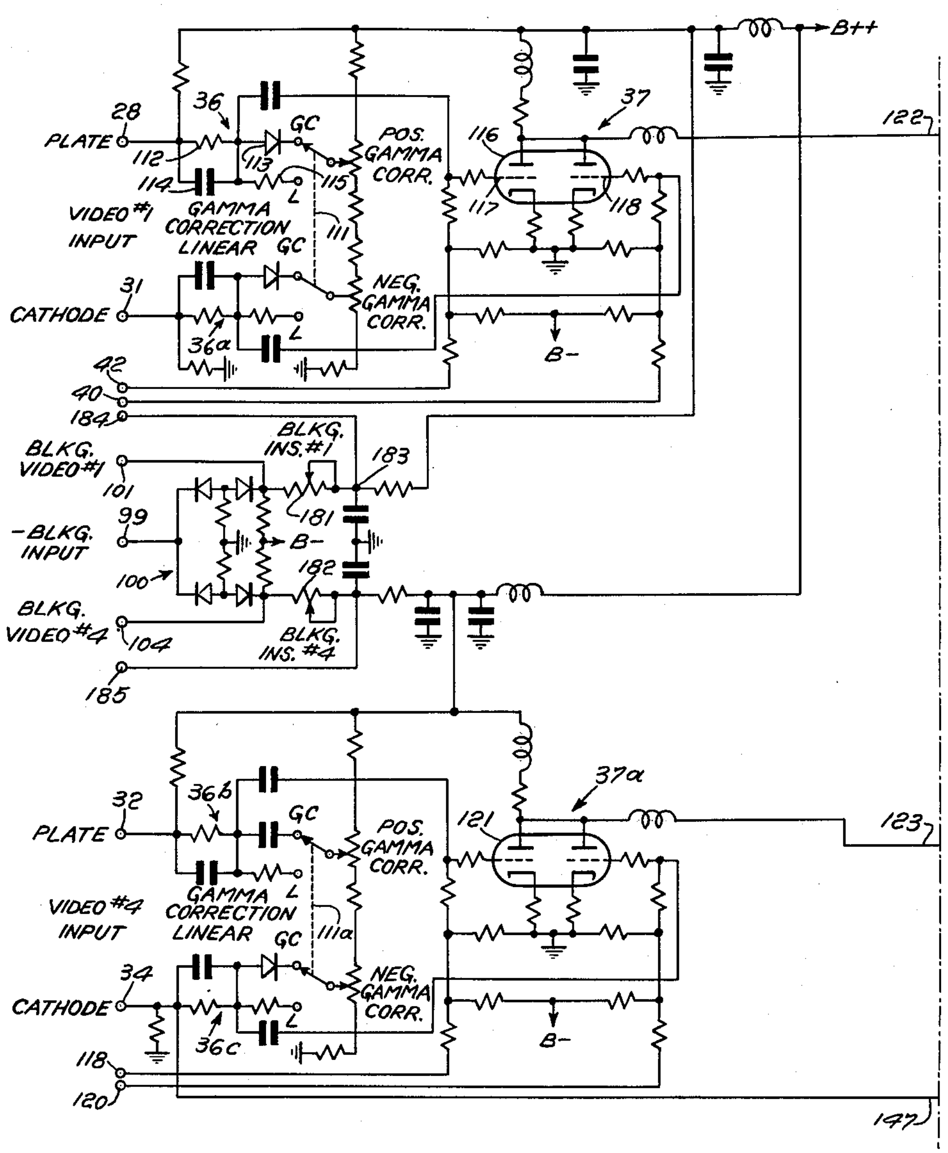
Figs. 4A–4D illustrate in schematic form the montage amplifier of Fig. 3 when the Figs. 4A–4D are arranged as illustrated in Fig. 5.
Figure 4B:
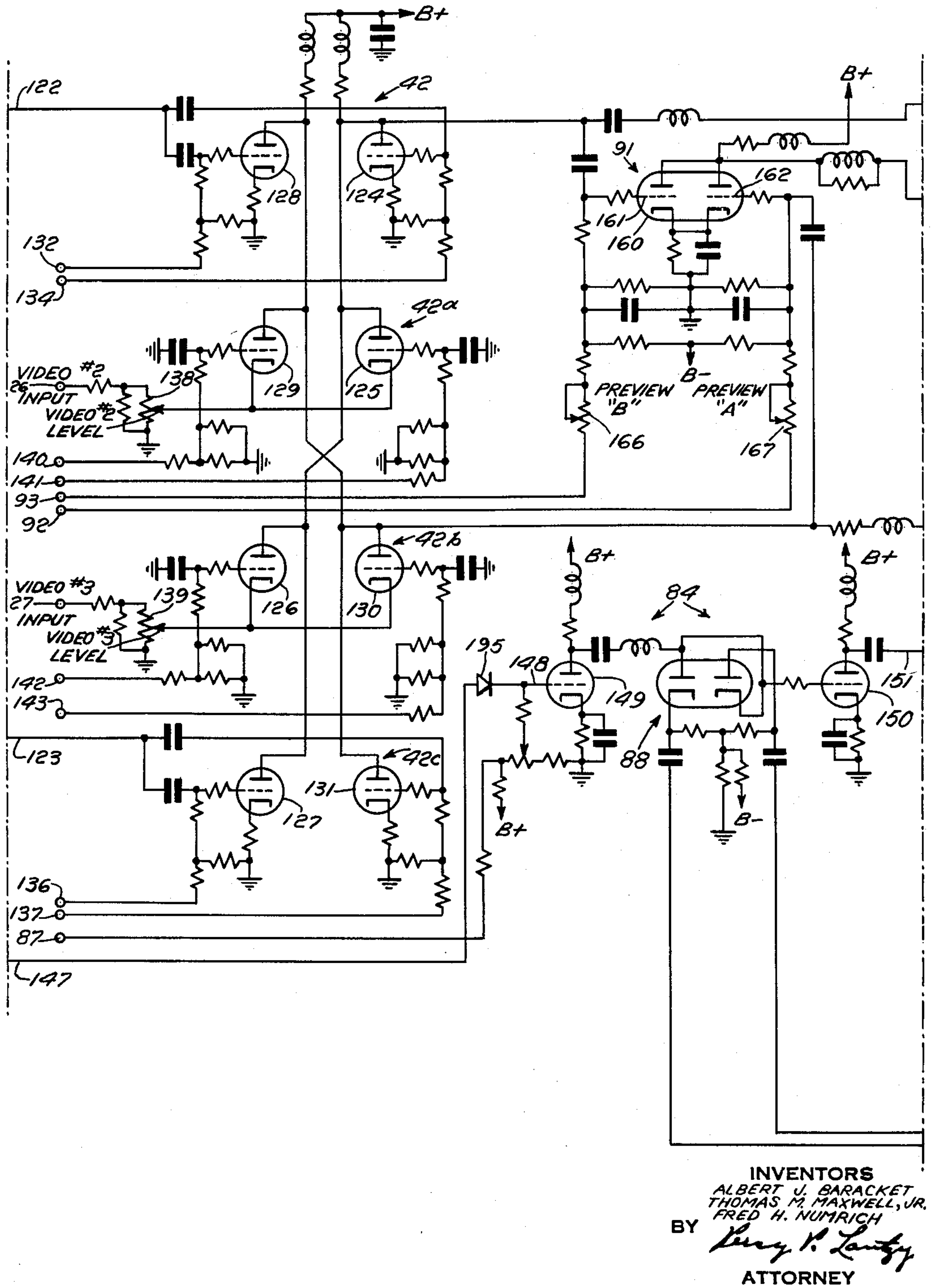
Figure 4C:
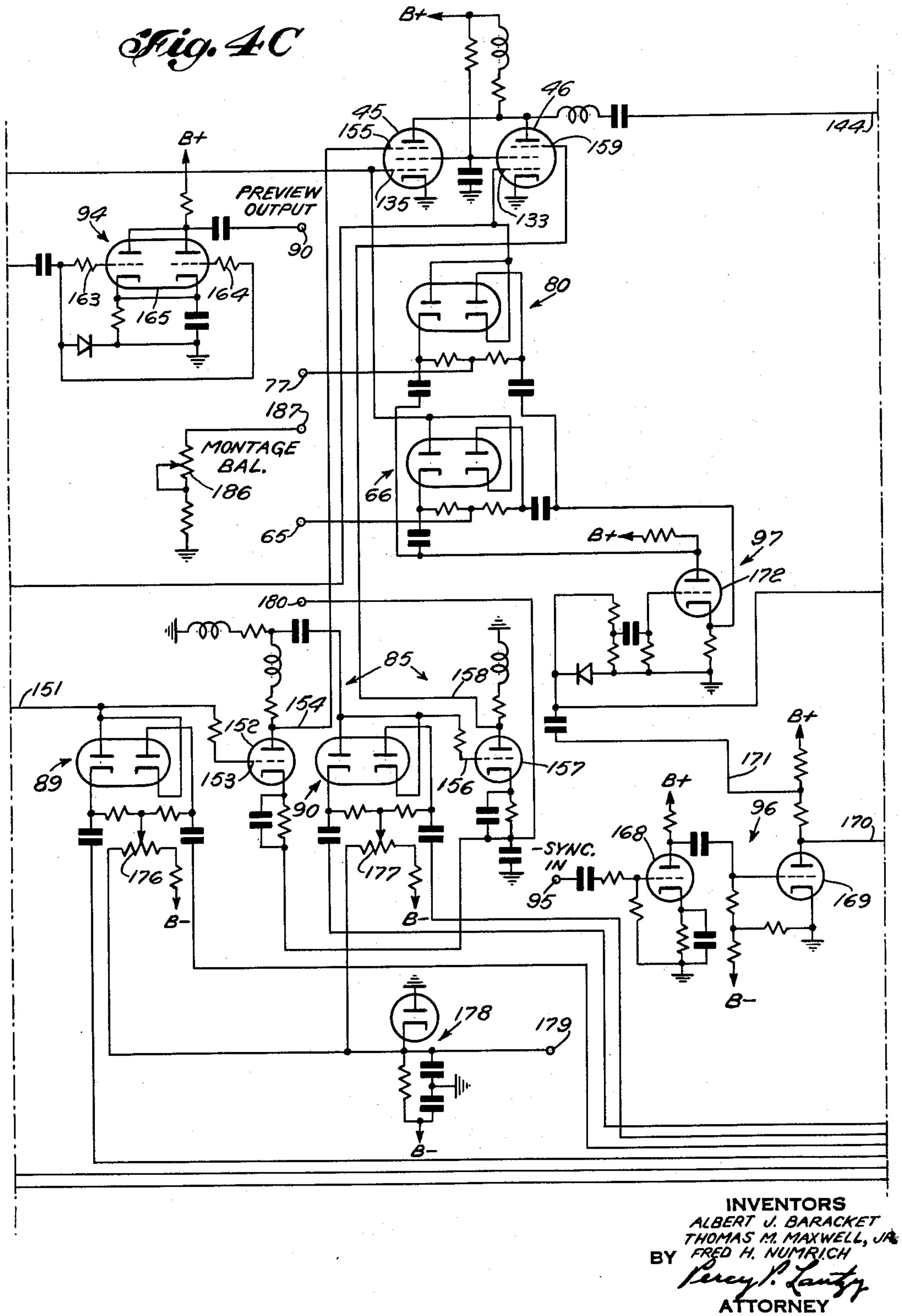
Figures 4D, 5, 6:
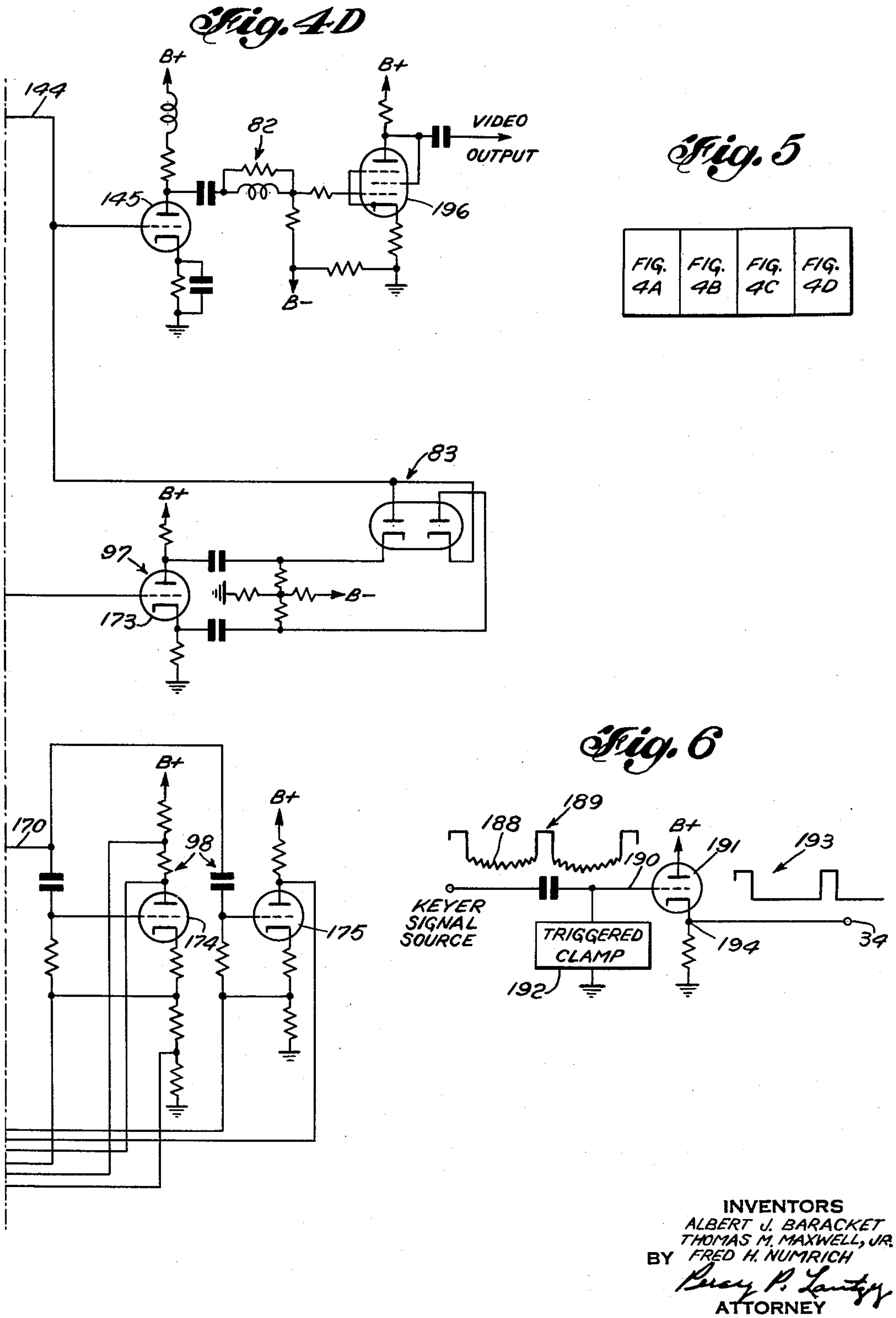
Fig. 6 is a schematic diagram illustrating the keying signal clipping arrangement incorporated in a predetermined one of the projection units of Fig. 1D.

Referring to Figs. 4A–4D arranged in accordance with Fig. 5, there is illustrated the schematic diagram of montage amplifier 3 of Fig. 1C in accordance with the montage amplifier block diagram of Fig. 3. As described hereinabove, each of the projection units 1 and 2 have the possibility of two outptus, one output when a positive transparency is employed therein and the other output when a negative transparency is employed therein. The appropriate output consistent with the type of transparency employed is selected by the positive-negative switches 24 and 25 of their respective projection units. The output of the projection unit is coupled to terminal 28 or terminal 31 in the case of the projection unit 1, and terminal 32 or terminal 34 in the case of projection unit 2, dependent upon the type of transparency employed and the appropriate position of the positive-negative switches. As illustrated in Fig. 4A both the plate or cathode inputs may be gamma corrected by the appropriate positioning of the gamma correction-linearity switch 111 and 111*a*. The operation of each gamma correction circuitry is described in detail in the copending application, Serial No. 301,070, wherein resistance 112 and crystal diode 113 comprises the gamma correcting elements while condenser 114 is incorporated as the frequency compensating element. If gamma correction of the input signal from the projection units is not desired, switch 111 may be placed in thhe linear position which enables the video signal to traverse resistor 115 which applies an attenuation to the signal equal to that of the gamma correction circuitry thereby eliminating the necessity for readjustment of video level controls if gamma correction is removed while the equipment is in operation. The reference characters employed in the description of the gamma correction circuit and its associated switch which have been applied only to the video signal terminal 28, likewise apply to the identical circuitry associated with each of the other video signal input terminals associated with video signal #1 and video signal #4.

Associated with the video signal #1 inputs and video #4 inputs are switchers 37 and 37*a* respectively, wherein each of the switches including a double triode electron discharge device as indicated at 116. Grid 117 of device 116 is coupled to the plate input from projection unit 1 through terminal 28 and grid 118 thereof is connected to the cathode input from projection unit 1 through terminal 31. The operation of the positive-negative switch 24 in projection unit 1 selects that portion of device 116 which will conduct. When switch 24 is in the positive position, a negative bias is applied at terminal 40 to maintain a bias upon grid 18 such that that portion of device 16 is rendered non-conductive enabling the positive input from terminal 28 to be conducted through that portion of device 116 associated with grid 117. If switch 24 is moved to the negative position, a negative bias is presented at terminal 42 to render the left hand portion of device 116 associated with grid 117 non-conductive and allow the right hand portion of device 116 to conduct the signal therethrough. The operation of switcher 37*a* is identical to that described hereinabove with respect to switcher 37 with the exception that switch 25 applies the negative bias voltage to terminals 119 and 120 dependent upon the position of switch 25 to control the conduction of the left and right hand portions of electron discharge device 121, in accordance with the type of transparency employed in projection unit 2.

The signal output of switcher stages 37 and 37*a* are respectively coupled to their associated preselector stages 42 and 42*c* along conductors 122 and 123. The video signal input from video signal 2 source and video signal 3 source at terminals 26 and 27 are coupled to their respective preselector stages 42*a* and 42*b*. These preselector stages function to enable the selection of a particular signal from a given signal source to be routed through either one of the two channels included in the signal routing means. Each preselector stage includes an electron discharge device associated with the input to amplifier 45 of channel B such as electron discharge devices 124, 125, 126 and 127. A second electron discharge device is included in each preselector circuit for switching selected signals to amplifier 46 of channel A such as indicated by electron discharge devices 128, 129, 130 and 131. In the case of video signal from switchers 37 and 37*a*, the video signal is applied to the grids of the electron discharge devices of the associated preselector stages. The selection of the signal from the video source to either one of the internal channels is accomplished by the key switches 43 and 44 associated with the respective signals from video source #1 and video source #4. The electron discharge devices 124, 127, 128 and 131 are normally non-conductive. If key switch 43 is placed in position A, a positive voltage is applied to terminal 132 lowering the bias of electron discharge device 128 to permit conduction thereof which results in the routing of the selected video signal to the grid 133 of amplifier 46. If key switch 43 is placed in position B, a positive voltage is applied to terminal 134 to lower the bias of electron discharge device 124 permitting conduction thereof and maintaining electron discharge device 128 in a cut-off condition. The conduction of device 124 enables the signal from video source #1 to be conducted to grid 135 of amplifier 45 for routing the selected signal through channel B.

Electron discharge devices 127 and 131 included in preselector stage 42*c* have the bias thereon controlled by key switch 44 which enables the presentation of a positive bias signal to terminal 136 and 137 dependent upon the position in which switch 44 is placed thereby enabling the conduction of the appropriate electron discharge device for routing signal of video #4 source to the selected channel.

The signals from video #2 and video #3 sources are coupled from terminals 26 and 27 respectively through external video controls 138 and 139 to the cathodes of electron discharge devices 129 and 125 of preselector 42 and electron discharges 126 and 130 of preselector 42*b*, respectively. The conduction of these respective electron discharge devices are controlled by means of key switches 49 and 50 and the bias voltage sources associated therewith. When key switch 49 is placed in the A position, the bias voltage is coupled to terminal 140 to channel video signal #2 to grid 133 of device 46. Positioning key switch 49 in position B, a bias voltage is coupled to terminal 141 for channeling video signal #2 to grid 135 of amplifier 45 by conduction of electron discharge 125. A similar shunting of video signal #3 to the channel amplifiers of the signal routing means is accomplished by key switch 50 and its associated bias voltage by coupling the bias voltage to terminals 142 and 143 for appropriate conduction of electron discharge devices 126 and 130. The amplitude of the signal input from source #2 and source #3 are varied as desired by panel controls 138 and 139.

As hereinabove disclosed, the outputs of the four preselector stages are coupled to either amplifier 45 or amplifier 46 depending upon the position of the appropriate key switches. Each grid of amplifiers 45 and 46 are clamped at a predetermined reference level by means of the clamp stages 66 and 80, respectively. The selection of signals from amplifiers 45 and 46, or both, for the video signal output, is accomplished by pushbuttons 59, 46 and 81 and their associated relays. The relay associated with pushbutton 49 provides a voltage on terminal 77 for raising the reference voltage on clamp 80, reducing the bias on grid 133 of electron discharge device 46 thereby permitting the normally non-conductive device to become conductive. The operation of pushbutton 76 changes the reference voltage on clamp 66 by presenting a voltage at terminal 65 which causes a reduction in the bias on amplifier 45 and thereby permits the normally non-conductive device to become conductive.

The operation of pushbutton 81 permits both amplifiers 45 and 46 to conduct if the amplitude of the signal from the source selected by the key switches is sufficient, as adjusted by the external level controls 53, 84, 138 and 139, to overcome the bias on the respective grids of amplifier 45 and 46 as established by the clamps 66 and 80.

As hereinabove mentioned automatic switching of output signal between channels A and B can be controlled to accomplish a fade or a lap dissolve at three different rates as selected by switches 68 and 70 of Fig. 1A. The resultant output from the channels is coupled along conductor 144 to the video amplifier stage 82 including therein electron discharge devices 145 and 146 for further amplification of the selected video signal or signals before application thereof to the video output for conduction to the video generator 4.

By appropriate variations in the bias potential of amplifiers 45 and 46 and the preselectors 42—42*c*, two or more signals may be mixed automatically or manually, a fade effect may be produced, and a lap dissolve effect may likewise be accomplished with the normal-montage switch positioned in the normal position. When the normal-montage switch is placed in the montage position and a masking slide is inserted in projection unit 2 for generating a keying signal, as described in copending application, Serial No. 279,230, an automatic space sharing of two signals in a single frame signal is accomplished by selecting the periods of conduction existing between amplifiers 45 and 46. The keying signal as developed in projection unit 2 is coupled to terminal 34 of the video #4 input and hence along conductor 147 to the grid 148 of electron discharge device 149 forming a single portion of keyer amplifier 84. The keying signal is amplified by electron discharge device 149 and has the anode output thereof clamped by clamp stage 88 prior to amplification by the second portion of keyer amplifier 84 including electron discharge device 150. The output signal of electron discharge device 150 is coupled along conductor 151 to the grid of electron discharge device 152 with the grid 153 being clamped at a predetermined reference potential by the clamp stage 89. Electron discharge device 152 comprises the first portion of keyer 85, the anode output of which is coupled along conductor 154 to the suppressor grid 155 of amplifier 45. A second anode output of electron discharge device 152 is coupled to grid 156 of electron discharge device 157 forming the second portion of keyer amplifier 85. The anode output of device 157 is coupled along conductor 158 to the suppressor grid 159 of amplifier 46. If the keying signal on grid 153 has a positive sense, the output of conductor 154 will have a negative sense. Likewise, the keying signal appearing on grid 156 will have a negative sense with the anode output of device 157 coupled by conductor 158 to amplifier 46 having a positive sense. Thus, amplifier 45 would be keyed off by the signal on suppressor grid 155 while amplifier 46 would be keyed on by the keying signal appearing on suppressor grid 159. By this means, the keyer 85 is able to automatically key alternately channels A and B, one channel being keyed during the black portion of the masking slide and the other channel being keyed during the white portion thereby providing as a video output two or more signals sharing the frame signal coupled from the video output of electron discharge device 146.

It is obvious that automatic alternate conduction of channels A and B can be achieved by coupling the keying signal outputs from keyer 85 to the control grids 135 and 133 of amplifiers 45 and 46, respectively, rather than to the suppressor grids thereof to provide as a video output two or more signals sharing the space of a single frame signal.

With the normal-montage switch 72 positioned on normal, and either of the automatic A or automatic B relays energized, the selected video channel A or B is applied to the video output. The other channel as determined by the preselector stages and the bias coupled to terminals 92 and 93 automatically switches another selected signal to the preview output circuit. The preview output circuit includes a preselector 91 having therein a twin triode electron discharge device 160. Grid 161 is coupled to the channel B output of the preselectors and grid 162 is coupled to the channel A output of the preselectors. If channel A is selected to route a given signal to the video output the grid of device 160 will be biased beyond cut-off by the bias voltage coupled to either terminal 92 or 93 as the case may be. Another selected signal may be coupled to the other path of the preselector output which will be amplified by the appropriate section of device 160 for application to the grids 163 and 164 of electron discharge device 165 comprising the preview output stage 94 for further amplification and delivery to the preview monitor by means of terminal 90. Preview gain adjustments for both channels are located in the grid circuits of electron discharge device 160 as indicated at 166 and 167. The provision of the preview selector enables an operator to monitor a selected video signal prior to switching said signal to the video signal output.

A negative synchronizing signal applied at terminal 95 from the video generator 4 is amplified by the electron discharge devices 168 and 169 comprising the pulse amplifier 96. The output of electron discharge device 169 is coupled to clamp driver 98 along conductor 170 and to clamp driver 97 along conductor 171, each of the clamp drivers 97 and 98 include two electron discharge devices 172, 173 and 174, 175 respectively. Electron discharge device 170 establishes the reference bias voltage for clamping stages 66 and 80 associated with amplifiers 45 and 46 while electron discharge device 173 cooperates in establishing the reference bias voltage for the clamp stage 83 associated with electron discharge device 145 of the video amplifier 82. In the case of clamp driver 98, electron discharge devices 174 and 175 cooperate to provide the reference bias voltages for clamps 88, 89 and 90 associated with the keyer amplifier 94 and the keyer 85 outputs, respectively. The clamps 89 and 90 have associated therewith a variable resistance 176 and 177, respectively, for varying the reference bias potential. The potentials for variable resistors 176 and 177 are obtained from a minus B voltage supply which besides establishing the reference bias cooperates with the voltage regulator 178 to produce a negative voltage less than the B minus voltage employed throughout this system, such as negative 105 volts. This negative voltage is made available at terminal 179 of the montage amplifier. The negative voltage at terminal 179 is coupled to section 71 of the normal montage switch 72. Switch 72 functions to make the negative voltage available along conductor 180 for coupling to the cathode circuits of electron discharge device 157 and electron discharge device 152 of the keyer, the negative voltage being of such a value that conduction of the keyer 85 is permitted when switch 72 is in the montage position and cut-off when montage switch 72 is in the normal position.

As described hereinabove, the montage amplifier provides blanking insertion for projection units 1 and 2 when operating with negative transparencies. This negative correcting blanking is switched into operation when needed by the positive-negative switches 24 and 25 of the respective projection units. Proper blanking insertion level is established by the blanking insertion adjustments 181 and 182 with adjustment 181 being associated with projection unit #1 and adjustment 182 being associated with projection unit #2. The action of positive-negative switch 24 of Fig. 1D besides controlling the operation of switches 37 and 37*a* places a ground at point 183 by means of conductors coupled to terminal 184. This operation removes the positive potential from the B++ source applied at point 183 when switch 24 is in the positive position. The large positive voltage is employed to deactivate the blanking insertion operation of the montage amplifier when a positive transparency is being scanned but is effectively removed from point 183 by the action of switch 24 grounding this point and thereby permitting the insertion of the proper blanking signal. Switch 25 of projection unit #2 performs the same function via terminal 185 and has the identical effect upon the blanking insertion circuitry 100 as disclosed hereinabove with reference to projection unit #1.

The outputs of amplifiers 45 and 46 when switch 72 is in the montage position may be balanced by means of the montage balance adjustment 186, Fig. 4C, which is inserted into the amplifier circuitry by means of conductors coupled to terminal 187 and section 71 of the montage switch 72.

To assure that the keying signal derived in the projection unit #2 contains no irregularities in the negative regions of the keying signal, such as shading, a pulse clipping circuit is provided to minimize the effects of such irregularities occurring in the generated keyer signal. The clipping circuit referred to is illustrated in Fig. 6 and is disposed prior to the video output of projection unit 2 employed for the keying signal output, in this case, the cathode output. The clipping action not only minimizes irregularities in the negative portions of the keyer signal, as indicated at 188 of signal 189, but also allows greater utilization of the input characteristics of amplifier 84 so far as the desired portion of the input signal are concerned. The keyer signal 189 is coupled to the grid 190 of electron discharge device 191 wherein the signal reference level to the clipper 191 is maintained at a constant value by the trigger clamp 192 in the grid circuit of electron discharge device 191. Device 191 is used in a cathode in the following manner to provide a clipped keyer signal 193 from the cathode 194 of device 191. The signal 193 has an identical time relation with respect to signal 189, but as illustrated, has removed therefrom the irregularities 188. The clipped keyer signal is coupled to the montage amplifier and applied thereto at terminal 34 for utilization in the keying circuitry of the montage amplifier as hereinabove described. During normal operation, the montage keying pulse is prevented from passing the clipper by biassing the cathode of crystal diode 195 of Fig. 4B more positive than the maximum positive voltage developed by the cathode follower 191. This positive bias is provided at terminal 87 by means of section 86 of the normal-montage switch 72 and the positive voltage source associated therewith. The keyer signal level is adjusted by means of the keyer output adjustment 196 as illustrated in Fig. 1A.

While we have described above the principles of our invention in connection with specific apparatus, it is to be clearly understood that this description is made only by way of example and not as a limitation to the scope of our invention as set forth in the objects thereof and in the accompanying claims.

We claim:

1. A video signal switching and mixing system comprising a plurality of video signal sources, a plurality of signal selectors each having first and second conductive paths, means coupling the two conductive paths of each of said selectors to the output of a corresponding one of said video signal sources, a signal routing means having first and second signal channels and a common output for said channels, means coupling the first conductive paths of said selectors to said first signal channel, means coupling the second conductive paths of said selectors to said second signal channel, each of said selectors having control means for controlling conduction in the first and second paths thereof, and special effects control means for said signal routing means for controlling the conduction of said signal channels to provide a selection of special video signal effects at said common output.

2. A video signal switching and mixing system according to claim 1, wherein the control means of each of said selectors includes an electron discharge device in each of said conductive paths, and means for controlling selectively the bias to each of said electron discharge devices.

3. A video signal switching and mixing system according to claim 2, wherein the means for controlling selectively the bias to said electron discharge devices includes a source of bias voltage, and a key switch for selectively controlling application of said bias voltage to the electron discharge devices of said first and second paths.

4. A video signal switching and mixing system according to claim 1, wherein the special effects control means includes an electron discharge device in each of said channels, a bias clamping circuit for each of said electron discharge devices to normally render said electron discharge devices non-conductive, means to provide a reference voltage for said clamping circuits, and means to selectively vary the reference voltage of said clamping circuits to thereby obtain different special effects by changing the conductive condition of said electron discharge devices.

5. A video signal switching and mixing system according to claim 1, wherein certain ones of said video signal sources include first and second output means, said first output means being utilized for signals derived from negative type transparencies and said second output means being utilized for signals derived from positive type transparencies, and said means coupling the two conductive paths to the output of a corresponding one of said video signal sources includes a first electron discharge device coupled to said first output means and a second electron discharge device coupled to said second output means, a common output for said devices, a bias voltage source, and a switch intermediate said bias voltage source and said devices to couple the conductive paths of said selectors to a consistent one of said output means.

6. A video signal switching and mixing system according to claim 5, further including a gamma correction circuit as a portion of the input circuit to said first and second electron discharge devices.

7. A video signal switching and mixing system according to claim 1, further including a first normally non-conductive electron discharge device coupled to the output coupling means of said first conductive paths, a second normally non-conductive electron discharge device coupled to the output coupling means of said second conductive paths, and means, included in said special effects control means, to render said first electron discharge device conductive simultaneously with the conduction of said second channel and to render said second electron discharge device conductive simultaneously with the conduction of said first channel to provide a video signal preview feature.

8. A video signal switching and mixing system according to claim 1, wherein said special effects control means includes a source of keying signal, a clipping circuit for removing irregularities in the negative portion of said keying signal, a keyer amplifier coupled to the output of said clipping circuit, a keyer stage coupled to said keyer amplifier to key said signal routing means for an automatic time sharing of conduction between said first and said second signal channels to provide a montage effect, a bias source, and a normal-montage switch coupled to said bias source to cut off said keyer stage when switched to the normal position thereof.

9. A video signal switching and mixing system according to claim 1, wherein the control means of each of said selectors includes an electron discharge device having at least a cathode, an anode and a control grid in each of said conductive paths, and means for controlling selectively the grid bias to each of said electron discharge devices.

10. A video signal switching and mixing system according to claim 9, wherein the means for controlling selectively the grid bias to said electron discharge devices includes a source of positive bias voltage and a key switch for selectively controlling application of said bias voltage to the control grid of the electron discharge devices of said first and second paths.

11. A video signal switching and mixing system according to claim 9, wherein said means coupling the two conductive paths to the output of a corresponding one of said video signal sources includes a video signal level control for adjusting the amplitude of the signal from said video signal sources applied to the cathode of said electron discharge device.

12. A video signal switching and mixing system according to claim 9, wherein certain ones of said video signal sources include first and second output means, said first output means being utilized for signals derived from negative type transparencies and said second output means being utilized for signals derived from positive type transparencies, and said means coupling the two conductive paths to the output of a corresponding one of said video signal sources includes an electron discharge device coupled to said first output means and an electron discharge device coupled to said second output means, a common output for said last mentioned electron discharge devices, a bias voltage source, and a switch intermediate said bias voltage source and said last mentioned electron discharge devices to couple the appropriate one of said output means to the control grids of the electron discharge devices in each of said conductive paths.

13. A video signal switching and mixing system according to claim 1, wherein the special effects control means includes an electron discharge device having a cathode, a control grid, a screen grid and a suppressor grid in each of said channels, a bias clamping circuit for the control grid for each of said electron discharge devices to render said electron discharge devices normally non-conductive, means to provide a reference voltage for said clamping circuits, and means to selectively vary the reference voltage of said clamping circuits to thereby obtain different special effects.

14. A video signal switching and mixing system according to claim 13, wherein said means to selectively vary the reference voltages includes a plurality of pushbuttons to establish conduction for a selected one of said channels, one of said pushbuttons providing conduction in both of said channels for manual control of selected video signals for a superimposition, lap dissolve or fade presentation thereof, an auto-rate switch and a fade-lap switch coupled between said pushbuttons and said clamping circuits including means having an RC time constant network providing three different rates of interchange when switching from one channel to the other channel of said signal routing means by actuation of said pushbuttons.

15. A video signal switching and mixing system according to claim 13, further including a source of keying signal, a clipping circuit for removing irregularities in the negative portion of said signal, a keyer amplifier coupled to the output of said clipping circuit, a keyer stage coupled to said keyer amplifier and a given one of the control electrodes of the electron discharge devices in each of said channels to provide alternate conduction of the electron discharge devices in each of said channels to provide a montage effect, the bias source and a normal-montage switch coupled to said bias source for removing a cut-off bias from said keyer stage when said normal-montage switch is switched to the montage position for derivation of the desired montage effect.

16. A video signal switching and mixing system comprising a plurality of video signal sources, a plurality of signal selectors each having first and second conductive paths, means coupling the two conductive paths of each of said selectors to the output of a corresponding one of said video signal sources, a signal routing means having first and second signal channels and a common output for said channels, means coupling said first conductive paths of said selectors to said first signal channel, and means coupling the second conductive paths of said selectors to said second signal channel, each of said selectors having control means for controlling conduction in the first and second paths thereof.

17. A video signal switching and mixing system according to claim 16, wherein the control means of each of said selectors includes an electron discharge device in each of said conductive paths, a source of bias voltage, and a key switch for selectively controlling application of said bias voltage to the electron discharge devices of said first and second paths.

18. A video signal switching and mixing system comprising a plurality of video signal sources, a plurality of signal selectors each having first and second conductive paths, means coupling the two conductive paths of each of said selectors to the output of a corresponding one of said video signal sources, a signal routing means having first and second signal channels, means coupling said first conductive paths of said selectors to said first signal channel, means coupling the second conductive paths of said selectors to said second signal channel, each of said selectors having control means for controlling selectively the conduction in the first and second paths thereof, and an electron discharge device in each of said channels, a bias clamping circuit for each of said electron discharge devices to normally render said electron discharge devices non-conductive, means to provide a reference voltage for said clamping circuits, and means to selectively vary the reference voltage of said clamping circuits to thereby obtain different special effects by changing the conductive condition of said electron discharge devices.

References Cited in the file of this patent

UNITED STATES PATENTS

| | | |
|---|---|---|
| 2,315,784 | Goodale | Apr. 6, 1953 |
| 2,653,186 | Hurford | Sept. 22, 1953 |
| 2,679,554 | Hurford | May 25, 1954 |